US012700621B2

(12) United States Patent
Duan et al.

(10) Patent No.: US 12,700,621 B2
(45) Date of Patent: Aug. 4, 2026

(54) BATTERY DEGRADATION MONITORING ASSESSMENT AND MANAGEMENT

(71) Applicant: GM Global Technology Operations LLC, Detroit, MI (US)

(72) Inventors: Shiming Duan, Ann Arbor, MI (US); Chaitanya Sankavaram, Rochester Hills, MI (US); Xinyu Du, Oakland Township, MI (US); Shengbing Jiang, Rochester Hills, MI (US); Rasoul Salehi, Ann Arbor, MI (US); Yaqing Xu, Clawson, MI (US); Philip James Prociw, Clinton Township, MI (US); Ryan B. Moulliet, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 19/014,410

(22) Filed: Jan. 9, 2025

(65) Prior Publication Data

US 2026/0196577 A1     Jul. 9, 2026

(51) Int. Cl.
*H01M 10/42*     (2006.01)
*G07C 5/00*      (2006.01)
*B60L 58/16*     (2019.01)

(52) U.S. Cl.
CPC .......... *H01M 10/425* (2013.01); *G07C 5/008* (2013.01); *B60L 58/16* (2019.02); *H01M 2010/4278* (2013.01); *H01M 2220/20* (2013.01)

(58) Field of Classification Search
CPC ....... H01M 10/425; H01M 2010/4278; H01M 2220/20; G07C 5/008; B60L 58/16
See application file for complete search history.

(56) References Cited

U.S. PATENT DOCUMENTS

| | | | |
|---|---|---|---|
| 2023/0068963 A1 | 3/2023 | Eifert et al. | |
| 2023/0147212 A1 | 5/2023 | Epler | |
| 2023/0305073 A1* | 9/2023 | Simonis | .............. G01R 31/367 |
| 2024/0359591 A1 | 10/2024 | Sarwar et al. | |

FOREIGN PATENT DOCUMENTS

DE     102022120962 A1     3/2023

OTHER PUBLICATIONS

German Office Action for German Application No. 102025107841. 6; dated Dec. 18, 2025; 5 pages.

* cited by examiner

*Primary Examiner* — Michael V Kerrigan
(74) *Attorney, Agent, or Firm* — CANTOR COLBURN LLP

(57)     ABSTRACT

A vehicle includes a battery having a set of battery sensors. A controller is in communication with the set of battery sensors. The controller stores instructions for performing operations of: Receiving a data set including multiple data sources and multiple data collection cycles from the set of battery sensors. Data sources are classified within the data set based on a frequency of change in data from the data sources. Data is processed by determining an average value of each data element across each data collection cycle for data originating from data sources in the first classification and by partitioning data originating from data sources into a variable space. Processed data is applied to at least one risk assessment model and an indication of a chance of battery health deterioration for the battery is identified. A function of the battery is alerted in response to a chance of battery health deterioration.

20 Claims, 4 Drawing Sheets

BATTERY DEGRADATION MONITORING ASSESSMENT AND MANAGEMENT

The subject disclosure relates to battery system monitoring and management, and more specifically to a system and process for monitoring battery degradation.

Electric vehicles and hybrid electric vehicles utilize battery systems to provide some or all of the power to the vehicle while the vehicle is being operated. It is appreciated that continuous use of the battery results in repeated charge and discharge cycles and can eventually result in reduced charge capacity and/or other reduced efficiencies and effectiveness of a battery.

Existing systems generally operate by monitoring a battery capacity (e.g. the maximum charge that can be held by the battery) on an individual battery basis. While such monitoring effectively identifies end of lifecycle and near end of lifecycle states of the individual batteries, the monitoring is unable to determine what particular health mechanisms, or combinations of health mechanisms, resulted in the battery end of lifecycle nor can this form of monitoring proactively identify and respond to risks. As a result, the monitoring is purely reactive and only able to identify when individual batteries need to be replaced or will need to be replaced soon.

Accordingly, it is desirable to provide a battery monitoring process that can detect battery degradation at early stages and identifies potential root-causes of the battery degradation.

SUMMARY

In one exemplary embodiment a vehicle includes a battery having a set of battery sensors. A controller is in communication with the set of battery sensors and has a non-transitory memory and a processor, the memory stores instructions for causing the controller to perform operations of: receiving a data set including multiple data sources and multiple data collection cycles of each data source from the set of battery sensors, classifying data sources within the data set into a first classification and a second classification based on a frequency of change in data from the data sources, processing data in the data set by determining an average value of each data element across each data collection cycle for data originating from data sources in the first classification and by partitioning data originating from data sources in the second classification into a variable space, applying processed data in the data set to at least one risk assessment model and identifying an indication of a chance of battery health deterioration for the battery, and automatically altering at least one function of the battery in response to an identified indication of a chance of battery health deterioration.

In addition to one or more of the features described herein the first classification is a slow dynamic data and the second classification is a fast dynamic data.

In addition to one or more of the features described herein partitioning data originating from data sources in the second classification into a variable space comprises segmenting a variable space into a plurality of grids and assessing a suitability of the segmented variable space by comparing a number of grids in the variable space to a predefined value.

In addition to one or more of the features described herein, the operations further include responding to the number of grids exceeding the predefined value by determining the segmented variable space is suitable for transmission.

In addition to one or more of the features described herein, the operations further include responding to the number of grids being less than or equal to the predefined value by determining the segmented variable is unsuitable.

In addition to one or more of the features described herein, the operations further include responding to the segmented variable space being unsuitable by identifying a region of interest including grids that meet a predefined set of parameters, and optimizing a cutoff value defining the segmented variable space based on the identified region of interest.

In addition to one or more of the features described herein the operations further include re-segmenting the variable space using the optimized cutoff values.

In addition to one or more of the features described herein the controller is in communication with an external data analysis system, and wherein processing data in the data set by determining an average value of each data element across each data collection cycle for data originating from data sources in the first classification and by partitioning data originating from data sources in the second classification into a variable space and applying processed data in the data set to at least one risk assessment model and identifying an indication of a chance of battery health deterioration for the battery are performed at the external data analysis system.

In addition to one or more of the features described herein, the operations further include losslessly encoding the data set into a low dimension latent space, transmitting the low dimension latent space from the vehicle to the external data analysis system and losslessly decoding the low dimension latent space.

In addition to one or more of the features described herein identifying an indication of a chance of battery health deterioration for the battery further includes identifying at least one fleetwide modification to battery operations based on the identified indication of the chance of battery health deterioration.

In another exemplary embodiment a method for monitoring a vehicle battery includes receiving, at a vehicle controller, a data set from the set of battery sensors, the data set including multiple data sources and multiple data collection cycles of each data source. The method classifies data sources within the data set into a first classification and a second classification based on a frequency of change in data from the data sources. The method processes data in the data set by determining an average value of each data element across each data collection cycle for data originating from data sources in the first classification and by partitioning data originating from data sources in the second classification into a variable space. The method applies processed data in the data set to at least one risk assessment model and identifying an indication of a chance of battery health deterioration for the battery. The method automatically altering at least one function of the battery in response to an identified indication of a chance of battery health deterioration.

In addition to one or more of the features described herein the first classification is a slow dynamic data and the second classification is a fast dynamic data.

In addition to one or more of the features described herein partitioning data originating from data sources in the second classification into a variable space comprises segmenting a variable space into a plurality of grids and assessing a suitability of the segmented variable space by comparing a number of grids in the variable space to a predefined value.

In addition to one or more of the features described herein, the method further includes responding to the number of grids exceeding the predefined value by determining the segmented variable space is suitable for transmission.

In addition to one or more of the features described herein, the method further includes responding to the number of grids being less than or equal to the predefined value by determining the segmented variable is unsuitable.

In addition to one or more of the features described herein, the method further includes responding to the segmented variable space being unsuitable by identifying a region of interest including grids that meet a predefined set of parameters, and optimizing a cutoff value defining the segmented variable space based on the identified region of interest.

In addition to one or more of the features described herein, the method further includes re-segmenting the variable space using the optimized cutoff values.

In addition to one or more of the features described herein the vehicle controller is in communication with an external data analysis system, and wherein processing data in the data set by determining an average value of each data element across each data collection cycle for data originating from data sources in the first classification and by partitioning data originating from data sources in the second classification into a variable space and applying processed data in the data set to at least one risk assessment model and identifying an indication of a chance of battery health deterioration for the battery are performed at the external data analysis system.

In addition to one or more of the features described herein, the method further includes losslessly encoding the data set into a low dimension latent space, transmitting the low dimension latent space from the vehicle to the external data analysis system and losslessly decoding the low dimension latent space.

In addition to one or more of the features described herein identifying an indication of a chance of battery health deterioration for the battery further includes identifying at least one fleetwide modification to battery operations based on the identified indication of the chance of battery health deterioration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
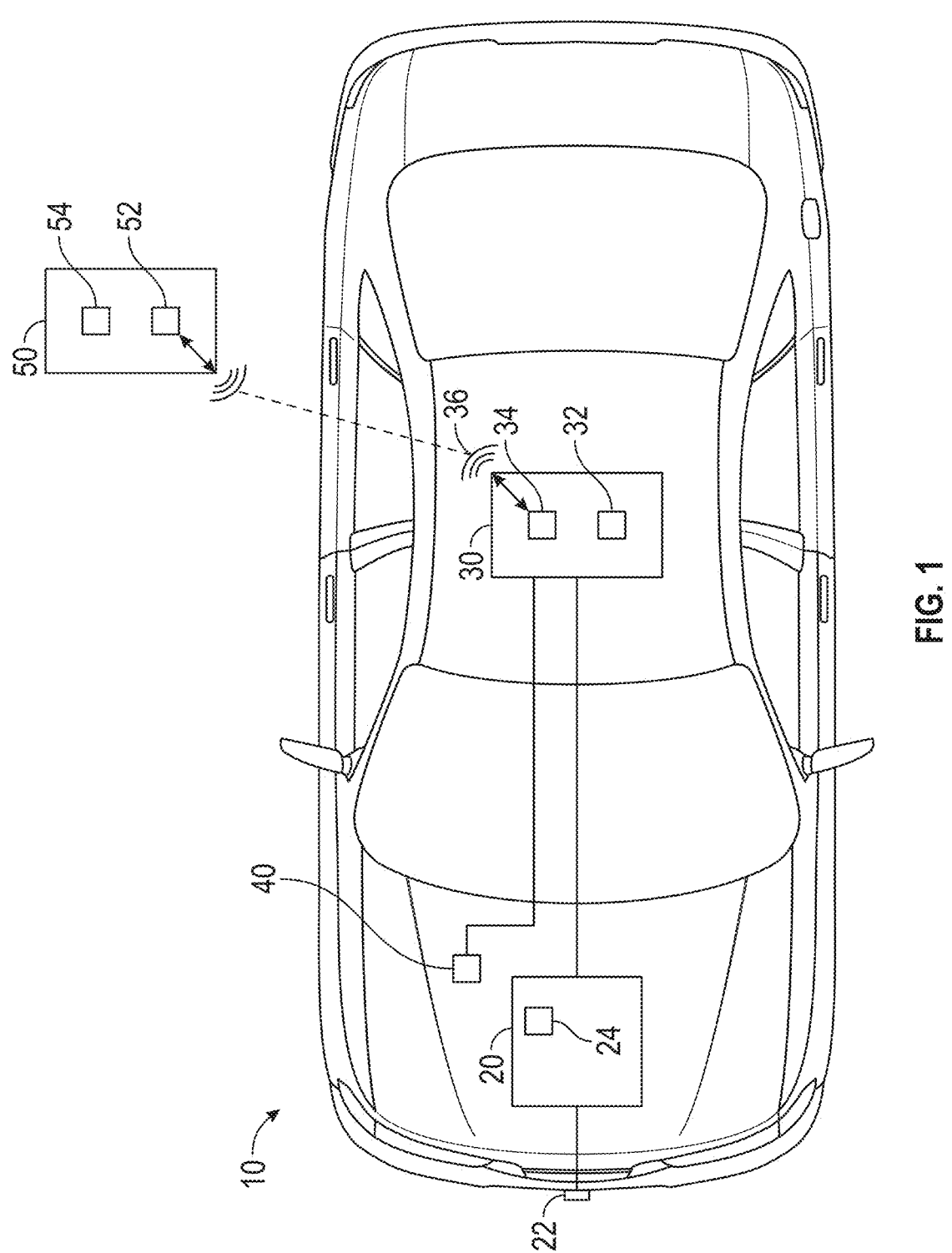
FIG. 1 is a top down schematic view of a vehicle in communication with a battery monitoring system.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term controller refers to a system including at least a processor and a memory, with the system being configured to perform or cause to be performed at least one operation. The system can be a dedicated controller including a single purpose processor and memory, a general control including one or more modules for performing the operation, a distributed system including multiple controllers in communication with each other and configured to control the operation, or any similar system.

In accordance with an exemplary embodiment, FIG. 1 illustrates a vehicle 10. The exemplary vehicle 10 is an electric vehicle including a battery system (battery 20). The battery 20 is connected to a charging port 22, with the charging port 22 being configured to receive power from an external power source and charge the battery 20. A controller 30 is in communication with the battery 20 and is configured to control operations of the battery 20 and monitor parameters of the battery (e.g. charging rate, capacity, discharge rate, etc.) using battery sensors 24.

In addition a sensor suite 40 provides vehicle 10 usage statistics and any other pertinent sensor information to the controller 30. The sensor suite 40 may include of any number of sensed types and configurations. The controller 30 includes a data collection module 32 and a data transmission module 34. The data collection module 32 collects and collates the data provided from the battery sensors 24 and the sensor suite 40.

In one example, the controller 30 further includes wireless or wired communication 36 able to connect to, and communicate with, an external data analysis system 50. The external data analysis system 50 includes a data extraction module 52 and a data analysis module 54. While described herein as four software modules, the data collection module 32, the data transmission module 34, the data extraction module 52 and the data analysis module 54 may be implemented in some practical implementations as any number of distinct interconnected software modules distributed throughout the controller 30, the external data analysis system 50, and/or any additional computer or controller systems in communication with the controller 30.

In yet another practical implementation, the software modules 32, 34, 52, 54 may be implemented entirely within the controller 30 and/or other vehicle based controllers. In such examples, portions of the process described herein related to the transmission of the collected data from the vehicle 10 to the external analysis system 50 may be omitted.

The combined processes of the software modules 32, 34, 52, 54 provide systems and functions able to detect and isolate degradation of the battery 20 over time based on the usage history of the battery 20. The combined processes can detect early degradation by monitoring the usage of the battery 20 and assessing a risk of failure modes developing. The combined processes provide insights that can help identify the root cause of battery 20 faults and identify the potential failure modes and can recommend reactions and modifications to the operations of the battery 20 to slow down degradation of the battery 20.

In implementations using the external data analysis system 50, the process described herein provides a data transmission that transmits relevant collected data from the vehicle 10 to the external data analysis system 50 using a substantially reduced bandwidth relative to existing data transmission processes.

In systems where the vehicle 10 is part of a fleet of vehicles including substantially similar battery 20 monitoring features, the external data analysis system 50 can engage in a fleet wide analysis and recommendation. Risk identifications are not limited to the specific vehicle 10. Furthermore, recommendations for mitigating risk are not limited to individual vehicles. By way of example, risk mitigation for a fleet may include actions such as assigning a vehicle to service less frequently, transferring a vehicle 10 to a warmer or colder environment, and the like.

In yet further examples, the processes described herein may be updated to existing vehicles as a software update, thereby allowing existing vehicles to implement the processes as well.

Figure 2:
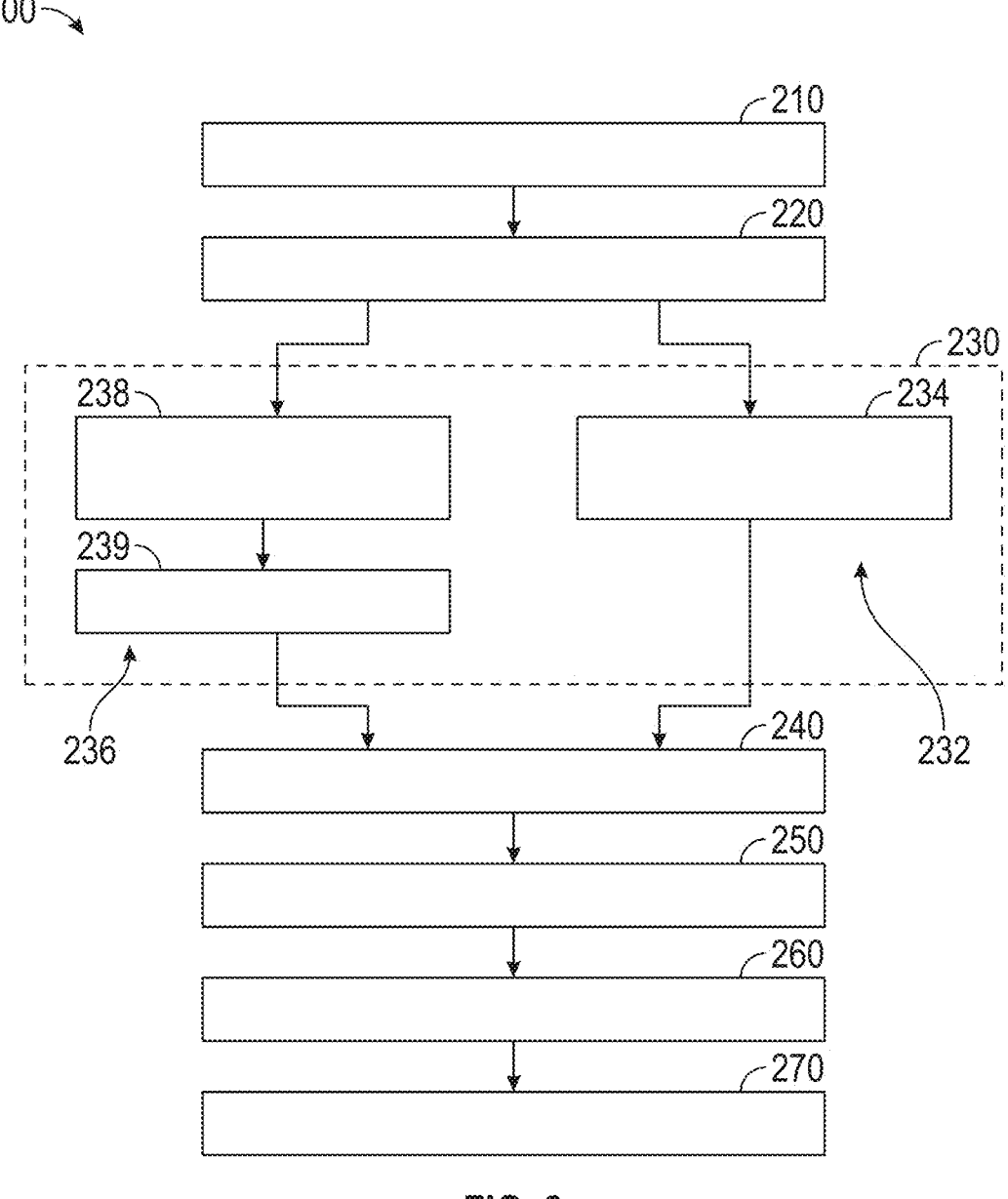
FIG. 2 is a process by which the vehicle and battery monitoring system of FIG. 1 monitor and respond to battery degradation over time.

With continued reference to FIG. 1, FIG. 2 illustrates a process 200 for collecting vehicle usage data and recommending alterations to the operations of a battery 20 in order to improve the battery lifecycle.

Initially the process 200 collects sensor readings from the battery sensors 24 and the sensor suite 40 in a collect data step 210. The sensed data includes charge capacity, charging speed, discharge speed, battery voltage, battery current, battery temperature, battery state of charge (SOC), estimated battery capacity, estimated battery resistance and similar battery health indicators. In some implementations, the data collection can be optimized based on the risk models being employed to analyze the risk of failure modes within the battery 20. In yet further implementations, the data utilized is selected based on correlation to risks being analyzed for, feature importance score, or any other methodology for identifying the most pertinent data from all available data.

The collected data is then classified into two types of data based on how much each particular data element varies across a given data collection cycle (e.g. two minutes) in a classify data sources step 220. Each data element is assigned to one of two classifications, fast dynamic data sources and slow dynamic data sources. Fast dynamic data sources are those sources that include elements that change rapidly or frequently over a given data collection cycle. In contrast slow dynamic data sources are those sources that include elements that change slowly (or not at all) over a given data collection cycle.

In one practical example, a data collection cycle may be per driving trip, and a fast dynamic data source is any data source that changes during a data collection cycle. A slow dynamic data source is a data source that changes less than a de minimis amount (e.g., 1%) within the data collection cycle.

Once classified, data from each data source is processed in a data processing step 230. The data processing step 230 is performed locally on the controller 30 prior to transmitting the data to the external data analysis system 50.

For data from a slow dynamic data source, the data follows a first processing path 232. On the first processing path 232, each data element is averaged over a data collection cycle in an average slow dynamic data step 234, and the average value is provided as an output from the processing step 230. Due to the low rate of change of the using the average data over each data collection cycle, across multiple data collection cycles, provides a strong approximation of the trajectory of the data element. This approximation can be used in multiple risk models.

Figure 3:
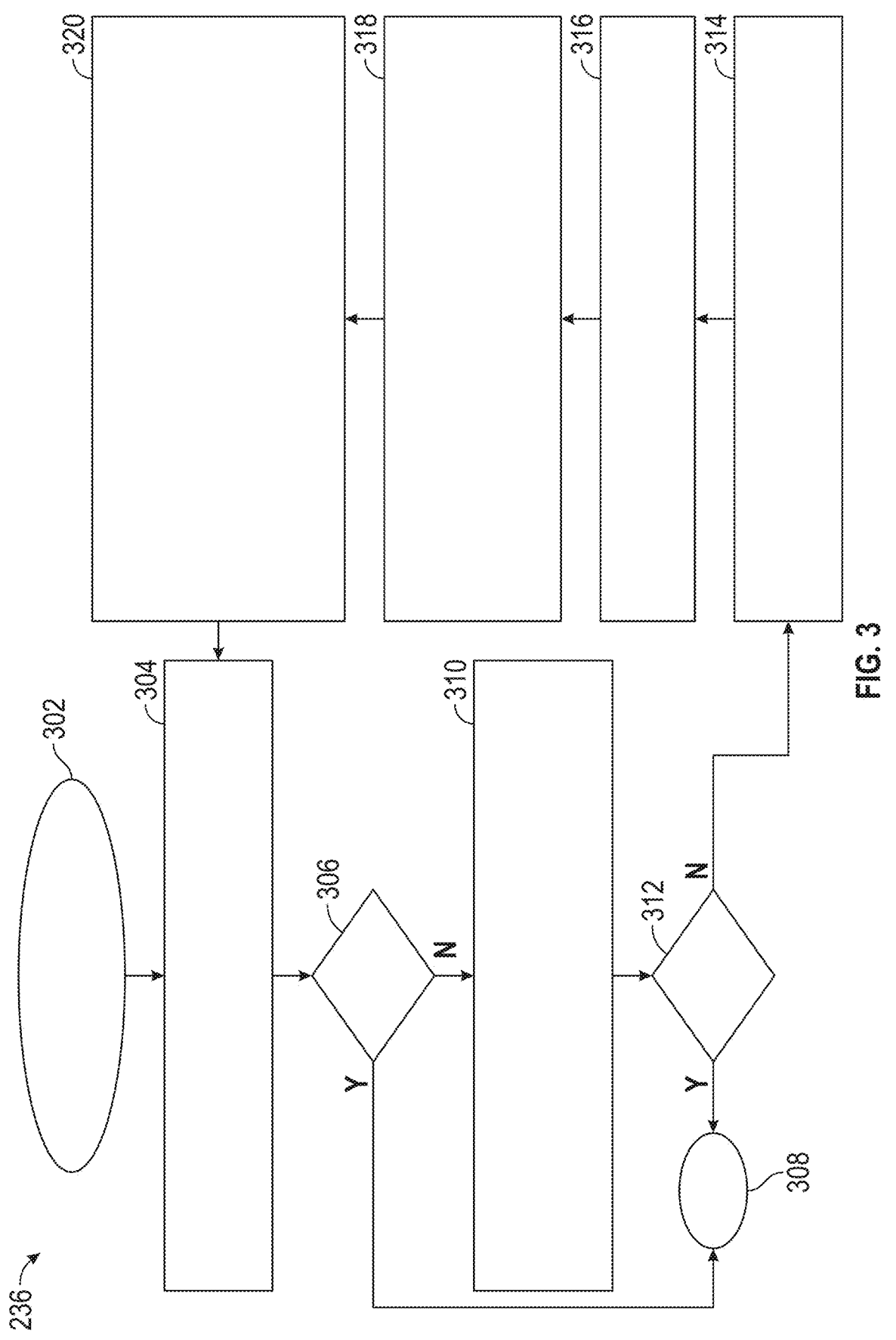
FIG. 3 is a process for partitioning fast dynamic data.
Figures 4, 5:
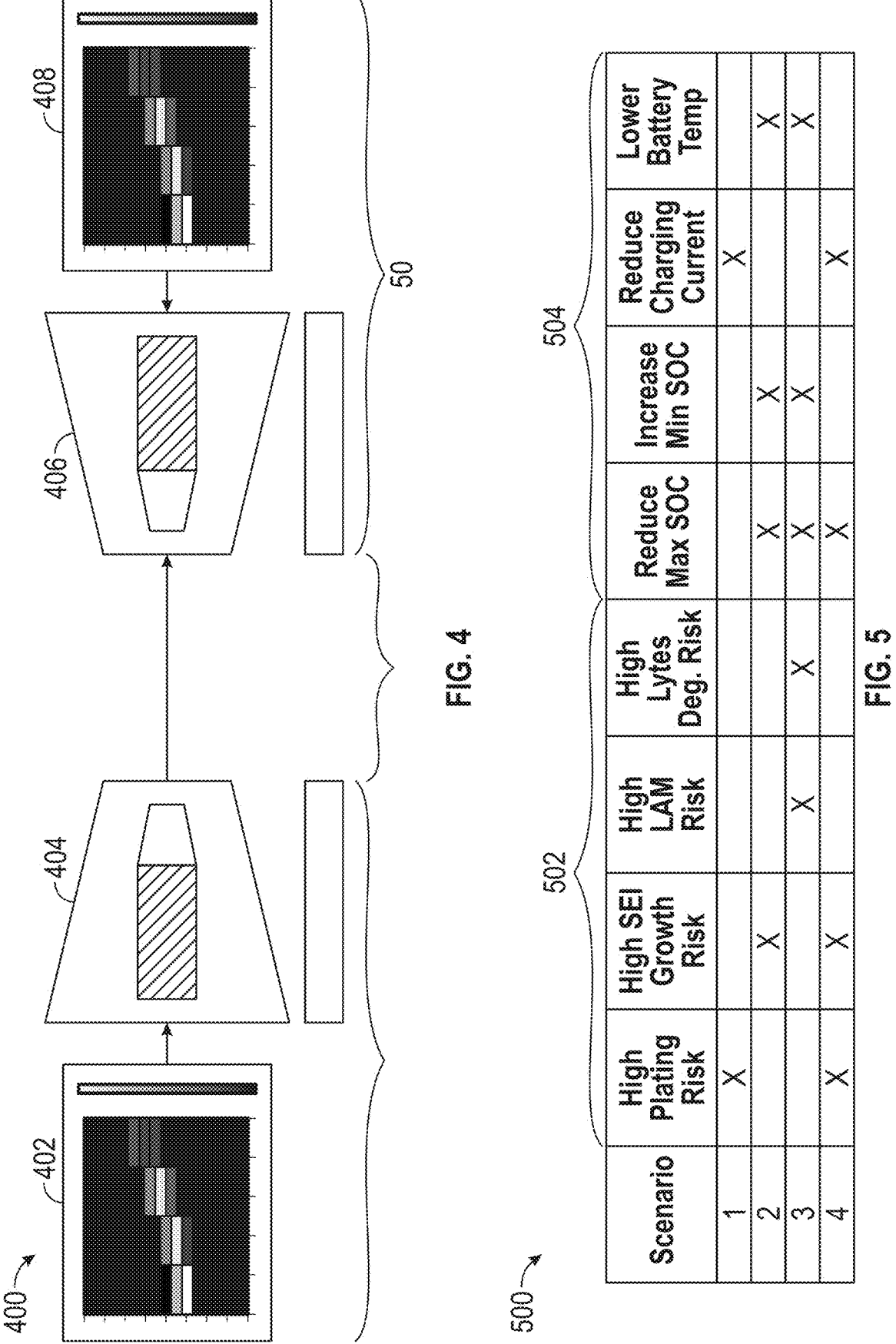
FIG. 4 is a process for encoding and decoding data for transmission.
FIG. 5 is an exemplary table associating risk patterns with recommended responses.

When the data is from a fast dynamic data source, the data follows a second processing path 236 and is initially partitioned in a partition fast dynamic data step 238. With continued reference to FIGS. 1-2, FIG. 3 illustrates the fast partitioning path 236 according to one example. Initially a set of the data is cut off providing a beginning time and an end time for the data in a cutoff data step 302 according to $$\text{cutoff}_i^k = \{\min(v_i), \max(v_i)\},$$

for k=0, i=1, 2, . . . , n where min(vi) is the minimum value of the data element (variable vi) and max(vi) is the maximum value of the data element, k is a number of iteration, k starting with iteration 0, i is each reading of the data element across the data collection cycle and n is the dimension of the variable space. Cutoff i^k is the cutoff points along variable i after kth iteration.

Once partitioned, a variable space defining the data element is segmented into N grids along the variable vi based on $$\text{cutoff}_i^k$$

for i=1, 2, . . . , n in a segmenting step 304. A grid is defined as $$\text{grid}_p^k,$$

where k is index of iteration, p is index of grids. For each grid, a count, mean and variance of the degradation risk value within that grid is determined.

After segmenting the variable space and determining the count, mean and variance value for each grid, the second processing path 236 assesses the partitioning to determine if the partitioning is satisfactory at a check 306. The partitioning is considered to be satisfactory when the number of grids N is at least as large as a predefined number of grids ($N_{max}$) or if there are no grids in a region of interest. Otherwise, the partitioning is not considered satisfactory.

When the partitioning is satisfactory, the second process path 236 ends at a stop element 308, and the data is considered satisfactorily partitioned.

When the partitioning is not satisfactory, the second processing path 236 identifies grids where the partitioning may be improved and assigns all such grids to a region of interest (R) in an identify region of interest step 310 using a set of grid parameters. In one example, the region of interest includes any grids that have a variance greater than 0.001, a count greater than 1000, and a mean having a magnitude of less than 0.2. In other examples the particular values of the grid parameters may be altered based on an expected available transmission bandwidth.

After identifying the region of interest (R), the second processing path 236 determines if there is at least one grid in the region of interest in a region of interest check 312. If there are no grids in the region of interest, the second processing path 236 determines that the partitioning is the best possible partitioning and proceeds to the stop element 308.

When at least one grid is identified in the region of interest, the second processing path 236 identifies which grid has a highest variance in degradation risk in a grid selection step 314. In one example, the grid (P*) with the highest variance of degradation risk is determined according to:

$$p^* = \operatorname*{argmax}_{\{grid_p^k \in R\}} \ \mathrm{Var}(\{\mathrm{risk}(V)|V \in grid_p^k\})$$

where V=[$v_1$, $v_2$, . . . , $v_n$]

Where argmax Var( ) is a function for identifying a highest variance, p is the index of a $$grid_p^k,$$

V is a datapoint in $$grid_p^k,$$

risk(V) is the degradation risk associated with that datapoint, and R is the region of interest.

After identifying the grid with the highest degradation risk, a new cutoff value is added to the set of cutoff values in an add cutoff value step 316. The new cutoff value is added at a median position of all datapoints in the grid. In one example, the new cutoff value is added according to:

$$med_j = \mathrm{median}(\{v_j|V \in grid_p^k*\}) \ \text{for} \ j = 1,$$

$$2, \ldots, n, \text{where } V = [v_1, v_2, \ldots, v_n].$$

After adding the new cutoff value, the second processing path 236 re-segments the variable space using the updated cutoff values, and identifies an axis that minimizes a total sum of squared deviations from the means in all the grids according to:

$$i^* = \operatorname*{argmin}_{i=1,2,\ldots,n} \frac{\sum_{p=1}^{N_i} \sum_{V \in grid_p^{k^i}} \left(\mathrm{risk}(V) - \mathrm{mean}_p^{k^i}\left(\mathrm{risk}(V)\right)\right)^2}{N_i}$$

where $N_i$ is number of grids after adding a cutoff value of $med_i$ along i axis, $$grid_p^{k^i}$$

is the pth grid after adding cutoff value of along i axis, $$\mathrm{mean}_p^{k^i}$$

is function for getting average value $$\text{for } V \in grid_p^{k^i}$$

In a re-segment step 318. The combined function of step 316 and step 318 is to optimize the grid along one axis and thereby minimize the sum of squared deviations from the mean in all the grids.

Once optimized, the second processing path updates the cutoff by optimizing the boundary along the selected axis in an update cutoff values step 320. In one example, the boundary is optimized by optimizing the cut along i* axis:

$$\mathrm{cutoff}_i^{k+1} = \mathrm{cutoff}_i^k \ \text{when } i \neq i^* \ \mathrm{cutoff}_i^{k+1} = \mathrm{cutoff}_i^{k+1} \cup \{med_i\},$$

$$\text{and} \left|\mathrm{cutoff}_i^{k+1}\right| = \left|\mathrm{cutoff}_i^k\right| + 1, \text{ when } i = i^*$$

Once optimized, the second processing path provides the optimized cutoff values to the segmentation step 304, and the second processing path 236 loops until a satisfactory partitioning is achieved resulting in step 308.

The segmented data is represented as the variable space, with each grid in the variable space having a value. The overall data size of the variable space is substantially smaller than the data size of the full data set.

The processed data sets are then collected and transmitted to the external data analysis system 50 in a collect and transmit data step 240. When the process 200 is being performed entirely local to the vehicle 10 collecting the data (e.g., when the process 200 is limited to a single battery 10 and does not apply fleetwide analysis), the collect and transmit data step 240 may be omitted, and the controller 30 performs all the steps of the process 200.

With continued reference to FIGS. 1-3, FIG. 4 illustrates an example system 400 for performing the collect and transmit data step 240. The processed data 402 is configured as a grid, including the slow dynamic data, and the controller 30 uses a lossless encoder 404 to encode the data into a low dimension latent space according to any known lossless compression process. The processed data and the lossless encoder 404 are functions of the controller 30.

The output of the lossless encoder 404 is transmitted using the wireless or wired connection to the external data analysis system 50. Once at the external data analysis system 50, the data is decoded using a lossless decoder 406 into a full data set 408 matching the encoded data set 402. The lossless decoder 406 may be any lossless decoding process suitable for the data sets being transmitted and received.

Once received at the external data analysis system 50, or at the controller 30 when being performed locally, the data is analyzed to identify potential risks of failure mode using at least one risk model in an assess risk and failure mode step 250. When multiple potential failure modes are being analyzed for, the data can be assessed multiple times via distinct assessment models.

By way of example, the process 200 may assess the data to identify plating risk, solid electrolyte (SEI) growth risk, loss of active material (LAM) risk, and electrolyte degradation risk. In such a case, each risk is modeled separately and the data is analyzed four times. The provision of multiple concurrent data types from the battery sensors 24 and the sensor suite 40 supports the utilization of multiple risk models by ensuring that all relevant data for each risk model is provided to the analysis.

The assessed risks are output as a chart indicating the combination of risks present based on the data. The chart is applied to a look up table, database, or other reference stored in a memory that correlates the set of risks identified with one or more recommended actions to eliminate or minimize the risk in a recommend action step 260.

With continued reference to FIGS. 1-4, FIG. 5 illustrates one exemplary look up table 500 including a first portion identifying risk patterns 502 and a second portion 504 identifying recommendations for minimizing the set of risk patterns. By way of example if the process 200 identifies a high plating risk, but no other potential risks are indicated (row 1 of table 500), the recommended action is reducing charging current provided to the battery 20, and no other action is recommended.

When a high SEI growth risk is indicated, and no other risks are indicated (row 2 of table 500), the recommended actions are to reduce a maximum state of charge, increase a minimum state of charge, and lower the battery temperature.

When a high LAM risk is indicated and high electrolyte degradation risk is indicated, and no other risks are indicated (row 3 of table 500), the recommended actions are to reduce a maximum state of charge, increase a minimum state of charge, and lower the battery temperature.

When a high plating risk is indicated and a high SEI growth risk is indicated, and no other risks are indicated (row 4 of table 500), the recommended actions are reducing a maximum state of charge and reducing a charging current.

While the exemplary table 500 includes entries for four combinations of risks, it is appreciated that with four risk models analyzed, up to sixteen possible rows may be utilized to encompass all possible outcomes. Furthermore, when one or more risk models provides more than a binary risk indication (e.g., no risk, low risk, high risk) additional rows may be added to accommodate the possible combinations of outputs. Furthermore, in some circumstances risks may be mutually exclusive, in which case less rows may be utilized as the two risks could not coexist. As such, it is appreciated that a designer of skill in the art can determine the appropriate number of rows for such a look up table 500 depending on the risks being analyzed for. When the recommended actions are determined by the external analysis system 50, the actions are transmitted to the controller 30.

Once at the controller 30, the recommended actions are implemented in an implement action step 270. In some cases, where the recommended action is adjustable via the controller 30, the controller 30 automatically implements the action. One such case is an example where the recommendation includes adjusting the maximums state of charge of the battery 20. The implementation of the recommendation may be either invisible, with no notice provided to the vehicle owner or operator or visible where a notification of the change and/or any indirect impacts of the change may be communicated to the owner or operator of the vehicle. Indirect impacts of the change include reduced range, increased expected charging time, and the like.

Of particular benefit is the data segmentation and optimization process, which substantially reduces a size of the data being transmitted thereby saving bandwidth and decreasing a time it takes to transmit the data.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
a battery including a set of battery sensors;
a controller in communication with the set of battery sensors, the controller having a non-transitory memory and a processor, wherein the non-transitory memory stores instructions for causing the controller to perform operations of:
receiving a data set from the set of battery sensors, the data set including multiple data sources and multiple data collection cycles of each data source;
classifying data sources within the data set into a first classification and a second classification based on a frequency of change in data from the data sources;
processing data in the data set by determining an average value of each data element across each data collection cycle for data originating from data sources in the first classification and by partitioning data originating from data sources in the second classification into a variable space;
applying processed data in the data set to at least one risk assessment model and identifying an indication of a chance of battery health deterioration for the battery; and
automatically altering at least one function of the battery in response to an identified indication of a chance of battery health deterioration.

2. The vehicle of claim 1, wherein the first classification is a slow dynamic data and the second classification is a fast dynamic data.

3. The vehicle of claim 1, wherein partitioning data originating from data sources in the second classification into a variable space comprises segmenting a variable space into a plurality of grids and assessing a suitability of the segmented variable space by comparing a number of grids in the variable space to a predefined value.

4. The vehicle of claim 3, further comprising responding to the number of grids exceeding the predefined value by determining the segmented variable space is suitable for transmission.

5. The vehicle of claim 3, further comprising responding to the number of grids being less than or equal to the predefined value by determining the segmented variable is unsuitable.

6. The vehicle of claim 5 further comprising responding to the segmented variable space being unsuitable by identifying a region of interest including grids that meet a predefined set of parameters, and optimizing a cutoff value defining the segmented variable space based on the identified region of interest.

7. The vehicle of claim 6, further comprising re-segmenting the variable space using the optimized cutoff values.

8. The vehicle of claim 1, wherein the controller is in communication with an external data analysis system, and wherein processing data in the data set by determining an average value of each data element across each data collection cycle for data originating from data sources in the first classification and by partitioning data originating from data sources in the second classification into a variable space and applying processed data in the data set to at least one risk assessment model and identifying an indication of a chance of battery health deterioration for the battery are performed at the external data analysis system.

9. The vehicle of claim 8, further comprising losslessly encoding the data set into a low dimension latent space, transmitting the low dimension latent space from the vehicle to the external data analysis system and losslessly decoding the low dimension latent space.

10. The vehicle of claim 8, wherein identifying an indication of a chance of battery health deterioration for the battery further includes identifying at least one fleetwide modification to battery operations based on the identified indication of the chance of battery health deterioration.

11. A method for monitoring a vehicle battery comprising:
Receiving, at a vehicle controller, a data set from a set of battery sensors, the data set including multiple data sources and multiple data collection cycles of each data source;
classifying data sources within the data set into a first classification and a second classification based on a frequency of change in data from the data sources;
processing data in the data set by determining an average value of each data element across each data collection cycle for data originating from data sources in the first classification and by partitioning data originating from data sources in the second classification into a variable space;
applying processed data in the data set to at least one risk assessment model and identifying an indication of a chance of battery health deterioration for a battery; and automatically altering at least one function of the battery in response to an identified indication of a chance of battery health deterioration.

12. The method of claim 11, wherein the first classification is a slow dynamic data and the second classification is a fast dynamic data.

13. The method of claim 11, wherein partitioning data originating from data sources in the second classification into a variable space comprises segmenting a variable space into a plurality of grids and assessing a suitability of the segmented variable space by comparing a number of grids in the variable space to a predefined value.

14. The method of claim 13, further comprising responding to the number of grids exceeding the predefined value by determining the segmented variable space is suitable for transmission.

15. The method of claim 13, further comprising responding to the number of grids being less than or equal to the predefined value by determining the segmented variable is unsuitable.

16. The method of claim 15 further comprising responding to the segmented variable space being unsuitable by identifying a region of interest including grids that meet a predefined set of parameters, and optimizing a cutoff value defining the segmented variable space based on the identified region of interest.

17. The method of claim 16, further comprising re-segmenting the variable space using the optimized cutoff values.

18. The method of claim 11, wherein the vehicle controller is in communication with an external data analysis system, and wherein processing data in the data set by determining an average value of each data element across each data collection cycle for data originating from data sources in the first classification and by partitioning data originating from data sources in the second classification into a variable space and applying processed data in the data set to at least one risk assessment model and identifying an indication of a chance of battery health deterioration for the battery are performed at the external data analysis system.

19. The method of claim 18, further comprising losslessly encoding the data set into a low dimension latent space, transmitting the low dimension latent space from the vehicle to the external data analysis system and losslessly decoding the low dimension latent space.

20. The method of claim 18, wherein identifying an indication of a chance of battery health deterioration for the battery further includes identifying at least one fleetwide modification to battery operations based on the identified indication of the chance of battery health deterioration.

* * * * *